July 17, 1956  C. BRANDON  2,754,687
SINE-COSINE MECHANISM
Filed Dec. 9, 1950
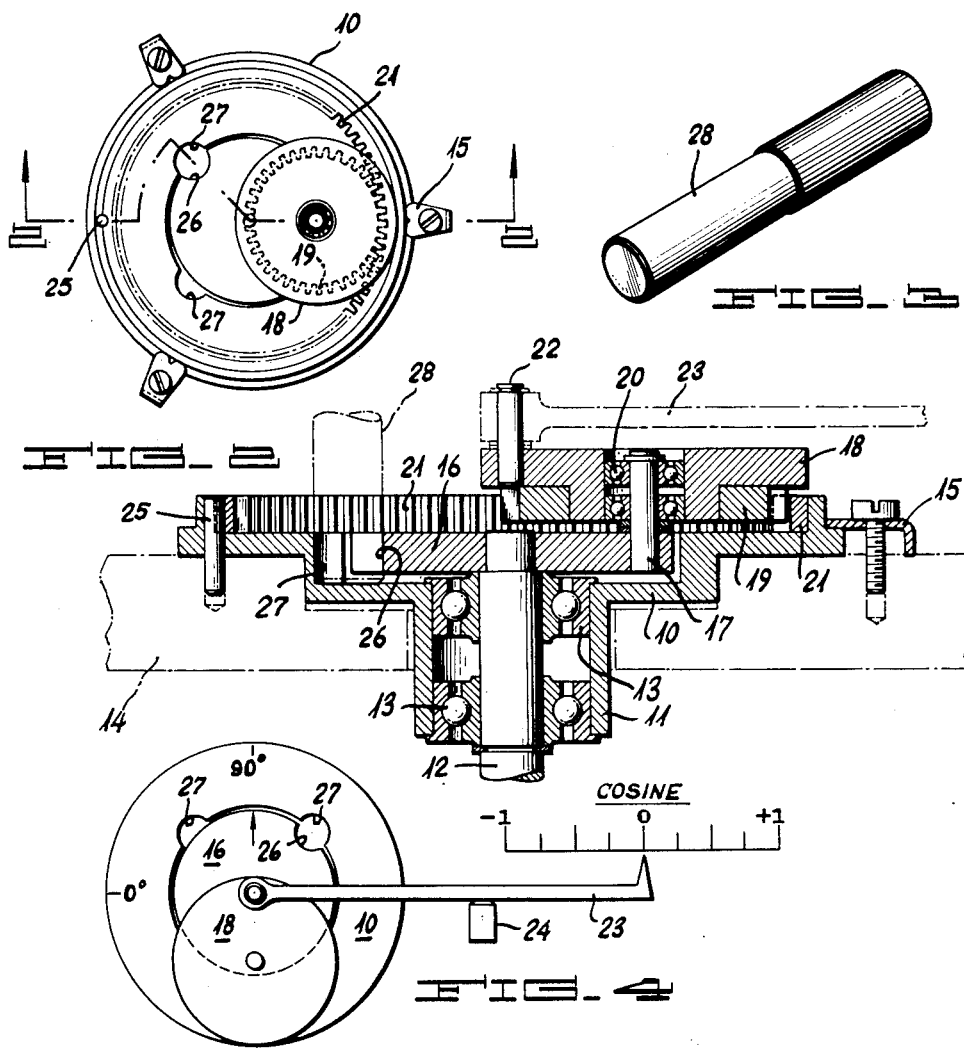
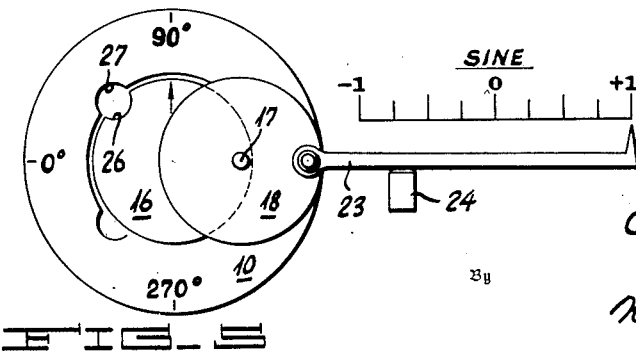
Inventor
CHESTER BRANDON
By Naylor and Lacagne
Attorneys United States Patent Office 2,754,687
Patented July 17, 1956

2,754,687

SINE-COSINE MECHANISM

Chester Brandon, La Canada, Calif., assignor to Librascope, Incorporated, Glendale, Calif., a corporation of California Application December 9, 1950, Serial No. 200,087

8 Claims. (Cl. 74—52)

The present invention relates to improvements in analog computers and more particularly to devices for converting rotational movements proportional to angular values into linear movements proportional to the sines, cosines, or similar functions of such angular values.

Sine-cosine mechanisms in which a pinion gear revolves in mesh with an internal gear of twice its pitch diameter are employed as components of many kinds of analog computers. The connection of such mechanisms with other computer components requires that each component be "zeroed" with respect to the mounting elements which support them, and previously known sine-cosine mechanisms of this type have been difficult to zero.

The present invention provides a sine-cosine mechanism of this type which may be conveniently and accurately zeroed at any of a plurality of points selected as zero points for mounting purposes. Thus, if overlying computer elements, for example, prevent the mounting of the mechanism at a zero degrees angular setting, it may be accurately zeroed at a setting ninety or one hundred eighty degrees removed therefrom; it being unlikely that overlying elements will prevent its mounting in one of such adjustments.

This is accomplished by providing a rotating element of the mechanism with a recess complemental to each of a group of recesses formed in a base member of the mechanism, so that when an alignment of recesses is effected, a dowel may be temporarily inserted to hold the mechanism zeroed in any of a plurality of positions. In order to minimize lost motion, it is preferred that the complemental recesses be coplanar and that the temporary dowel then be slightly tapered.

The invention is defined with particularity in the appended claims, but will be best understood from the following description of a preferred embodiment thereof, when read in conjunction with the accompanying drawings, in which:

Figure 1 is a plan view of a sine-cosine mechanism embodying the present invention;

Figure 2 is a sectional view of the mechanism taken on the line 2—2 of Figure 1, drawn on an enlarged scale;

Figure 3 is a perspective view of a zeroing dowel employed in connection with the present invention; and Figures 4 and 5 are schematic views illustrating the operation of the mechanism of the present invention in registering sines and cosines.

In the embodiment herein disclosed, the device consists of a base member 10 formed with a series of three concentric recesses. The smallest of these constitutes a bearing sleeve 11 receiving the end portion of a drive shaft 12 in ball bearings 13. Sleeve 11 is adapted to extend through a suitable aperture in a mounting panel, shown in broken lines at 14, to which the base member 10 is secured as by clamps 15. The free end of shaft 12 projects within the intermediate recess of the base member 10 and there carries a drive disk 16. The disk 16 carries a peripheral bearing stud or pin 17 which constitutes the journal for a drive pinion comprising a disk portion 18 and gear portion 19 mounted on stud 16 through intermediate ball bearings 20 seen in Figure 2. The gear teeth 19 of the drive pinion are in mesh with an internal gear 21 retained in the largest, outer, recess of base member 10. The disk portion 18 of the drive pinion carries a peripherally positioned output pin 22 serving as pivot for the arm 23 which is supported intermediate its ends on a suitable rest 24 for linear travel, for instance, on the scales seen in Figures 4 and 5. To insure accurate positioning of the related parts, the internal gear carrying portion of the base 10 carries a fixed dowel pin 25 extending into the internal gear and through base member 10; being adapted to engage a complemental hole in the mounting panel 14.

The pitch diameter of the gear portion 19 of the drive pinion is half that of the internal gear 21 around which it is caused to move through rotation of the drive disk 16 and the distance between the axis of said disk (shaft 12) and the journal pin 17 is half the pitch diameter of the pinion gear. The location of the output or pivot pin 22 for the indicator arm is coincidental with the pitch line of gear 19.

In order to provide for zeroing the indicator at any one of a plurality of points, the edge of drive disk 16 is formed with a semi-circular recess at 26. This recess corresponds in size to a series of four complemental recesses 27 formed in the peripheral wall of the intermediate portion of the base member 10 at 90° spacings. As can be readily seen, registration of the complemental recesses 26, 27 can be effected at any one of four points any one of which may be selected as zero point for the indicator. Provision for locking the mechanism at such selected point during mounting, etc. is made by means of a removable dowel pin 28 (Figure 3) fitting in the circular hole formed by registration of the recesses 26, 27. In either one of two diametrically opposite settings the center of the output pivot pin 22 will be in alignment with the axis of shaft 12, as in Figure 4. In the other two alternative settings the pin 22 will be at either of extremes of linear movement one of which is seen in Figure 5.

The invention thus provides a simple and efficient means for temporarily retaining mechanism of the type described locked against any movement or displacement from a setting selected for mounting. It will be obvious that variations in the specific locking means disclosed could be made without departure from the gist of the invention.

What is claimed is:

1. In a sine-cosine mechanism, a base member having a series of concentric circular recesses therein, an internal gear secured within the largest of said recesses, a shaft rotatably mounted in the smallest of said recesses, a disk mounted on one end of said shaft and loosely fitted within the intermediate one of said recesses, a series of substantially semicircular recesses disposed at 90° intervals about the wall of said intermediate one of said concentric recesses, a complementary substantially semicircular recess disposed in the edge of said disk and adapted to register with any of said first mentioned semicircular recesses to form a hole adapted to receive a zeroing dowel, a pinion gear meshing with said internal gear and rotatably mounted on said disk on a center spaced from the center of said disk a distance equal to half of the pitch diameter of said pinion gear; said pinion gear having a pitch diameter one-half that of said internal gear, and an output pin secured to said pinion gear.

2. In a sine-cosine mechanism, a base member having a series of concentric circular recesses therein, an internal gear secured within the largest of said recesses, a dowel extending through said internal gear and said base member and extending beyond said base member to provide means for dowelling said mechanism to a mounting, a shaft rotatably mounted in the smallest of said recesses, a disk mounted on one end of said shaft and loosely fitted within the intermediate one of said recesses, a series of substantially semicircular recesses disposed at 90° intervals about the wall of said intermediate one of said concentric recesses, a complementary, substantially semicircular recess disposed in the edge of said disk and adapted to register with any of said first mentioned semicircular recesses to form a hole adapted to receive a zeroing dowel, a pinion gear meshing with said internal gear and rotatably mounted on said disk on a center spaced from the center of said disk a distance equal to half of the pitch diameter of said pinion gear; said pinion gear having a pitch diameter one-half that of said internal gear, and an output pin secured to said pinion gear.

3. In a sine-cosine mechanism, a base member having a series of concentric circular recesses therein, an internal gear secured within the largest of said recesses, a dowel extending through said internal gear and said base member and extending beyond said base member to provide means for doweling said mechanism to a mounting, a shaft rotatably mounted in the smallest of said recesses, a disk mounted on one end of said shaft and loosely fitted within the intermediate one of said recesses, a series of substantially semicircular recesses disposed at 90° intervals about the wall of said intermediate one of said concentric recesses, a complementary, substantially semicircular recess disposed in the edge of said disk and adapted to register with any of said first mentioned semicircular recesses to form a hole adapted to receive a zeroing dowel, a pinion gear meshing with said internal gear and rotatably mounted on said disk on a center spaced from the center of said disk a distance equal to half of the pitch diameter of said pinion gear; said pinion gear having a pitch diameter one-half that of said internal gear, and an output pin secured to said pinion gear at a radial position thereon at which its center is coincidental with the pitch line; the center of said pin being aligned with the axis of said shaft when the semicircular recess of said disk is aligned with one of the semicircular recesses in the wall of said concentric recess.

4. In a sine-cosine mechanism arranged to convert rotation through an angle to a linear displacement proportional to the sine or cosine function of said angle, and having a base member with concentric recesses formed therein, an input shaft rotatably mounted in one of said recesses, a disk fixed to the end of said input shaft and freely rotatable within another of said recesses, a journal pin fixed in said disk, an output disk mounted on said journal pin, an output pin disposed in said output disk, and means associated with said output disk for converting rotation thereof about said journal pin to a linear displacement of said output pin; indexing means comprising an index pin receiving recess formed in one of said disks, and cooperative index pin receiving recesses formed at spaced intervals in said housing such that an index pin may be received in the disk and housing recesses only when the position of said output pin represents a maximum or minimum value of the sine or cosine function of said angle.

5. In a sine-cosine mechanism arranged to convert rotation through an angle to a linear displacement proportional to the sine or cosine function of said angle, and having a base member with concentric recesses formed therein, an input shaft rotatably mounted in one of said recesses, a disk fixed to the end of said input shaft and freely rotatable within another of said recesses, a journal pin fixed in said disk, an output disk mounted on said journal pin, an output pin disposed in said output disk, and means associated with said output disk for converting rotation thereof about said journal pin to a linear displacement of said output pin; indexing means comprising an indexing recess formed in one of said disks, and a plurality of spaced indexing recesses formed in said base member and positioned for the cooperative reception of an indexing pin by one of said spaced indexing recesses and the said indexing portion formed in said disk only when the position of said output pin represents a maximum or a minimum value of the sine or cosine function of said angle.

6. In a sine-cosine mechanism arranged to convert rotation through an angle to a linear displacement proportional to the sine or cosine function of said angle and having a base member with concentric recesses, an input shaft rotatably mounted in one of said recesses, a disk fixed to the end of said input shaft and freely rotatable within one of said recesses, a journal pin fixed in said disk, an output disk journaled on said journal pin, an output pin disposed in said output disk, and means associated with said output disk for converting rotation thereof about said journal pin to a linear displacement of said output pin, a plurality of indexing recesses disposed in positions in said base member spaced 90° apart about the center thereof, and an indexing recess associated with one of said disks and adapted for the reception of an indexing pin cooperatively with one of said recesses in said base member only when the position of said output pin represents a maximum or a minimum value of the sine or cosine function of said angle.

7. In a sine-cosine mechanism for analog computers comprising a base member having a recess therein, an input element rotatably mounted in said recess, an intermediate element rotatably mounted on said input element eccentrically thereof, interengaging means on said base member and said intermediate element operable to cause rotation of said intermediate element upon said input element when said input element is rotated, an output member mounted on said intermediate element and movable in a straight line passing over the axis of rotation of said input element during rotation of said intermediate element as aforesaid, and indexing means comprising a first dowel-receiving means in said base adapted to receive a zeroing dowel and a second dowel-receiving means in one of said elements; said first and second dowel-receiving means being located so as to align with each other only when said output member is aligned with the axis of rotation of said input element.

8. In a sine-cosine mechanism for analog computers comprising a base member having a recess therein, an input element rotatably mounted in said recess, an intermediate element rotatably mounted on said input element eccentrically thereof, interengaging means on said base member and said intermediate element operable to cause rotation of said intermediate element upon said input element when said input element is rotated, an output member mounted on said intermediate element and movable in a straight line passing over the axis of rotation of said input element during rotation of said intermediate element as aforesaid, and indexing means comprising a first dowel-receiving means in said base adapted to receive a zeroing dowel and a second dowel-receiving means in one of said elements; said first and second dowel-receiving means being located so as to align with each other only when said output member is at an extreme end of its straight-line movement.

References Cited in the file of this patent

UNITED STATES PATENTS

| | | |
|---|---|---|
| 1,210,861 | Sitney | Jan. 2, 1917 |
| 1,998,242 | Klocke | Apr. 16, 1935 |
| 2,166,975 | Sologaiston | July 25, 1939 |
| 2,360,762 | Conrad | Oct. 17, 1944 |
| 2,439,803 | Giesen | Apr. 20, 1948 |

OTHER REFERENCES

The Engineers Sketch Book, by Barber, Chemical Publishing Co. of New York Inc., 1938. Sketch No. 562, pages 68 and 69.